(12) United States Patent
Griffa et al.

(10) Patent No.: US 11,804,079 B2
(45) Date of Patent: Oct. 31, 2023

(54) PREDICTIVE FAILURE ANALYSIS FOR MECHANICAL SYSTEMS

(71) Applicant: TPS IP, LLC, Cleveland, OH (US)

(72) Inventors: Zachary A Griffa, Elkhorn, WI (US); John Nathaniel Olson, Milwaukee, WI (US)

(73) Assignee: TPS IP, LLC, Cleveland, OH (US)

( * ) Notice: Subject to any disclaimer, the term of this patent is extended or adjusted under 35 U.S.C. 154(b) by 352 days.

(21) Appl. No.: 17/023,983

(22) Filed: Sep. 17, 2020

(65) Prior Publication Data

US 2022/0084321 A1    Mar. 17, 2022

(51) Int. Cl.
*G06F 11/30* (2006.01)
*G07C 3/08* (2006.01)
*G01M 99/00* (2011.01)

(52) U.S. Cl.
CPC ............ *G07C 3/08* (2013.01); *G01M 99/005* (2013.01)

(58) Field of Classification Search
CPC .............................. G07C 3/08; G01M 99/005
See application file for complete search history.

(56) References Cited

FOREIGN PATENT DOCUMENTS

AU          2015249207 A1 * 11/2015 ............ B60L 3/0061

* cited by examiner

*Primary Examiner* — Phuong Huynh
(74) *Attorney, Agent, or Firm* — Amin, Turocy & Watson, LLP

(57) ABSTRACT

Techniques regarding determining the operating condition of one or more mechanical parts are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a status component that can update a predictive failure algorithm by altering a vibration threshold based on a measured temperature of a mechanical part. Also, the vibration threshold can characterize an amount of vibration associated with a standard operating condition of the mechanical part.

17 Claims, 12 Drawing Sheets

PREDICTIVE FAILURE ANALYSIS FOR MECHANICAL SYSTEMS

BACKGROUND

The subject disclosure relates to one or more predictive failure analyses for one or more oven systems, and more specifically, to updating one or more predictive failure algorithms for various mechanical parts based on a correlation between temperature and an amount of vibration experienced by the mechanical parts during operation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can determining the operating condition of one or more mechanical parts are described.

According to an embodiment, a system is provided. The system can comprise a memory that can store computer executable components. The system can also comprise a processor, operably coupled to the memory, and that can execute the computer executable components stored in the memory The computer executable components can comprise a status component that updates a predictive failure algorithm by altering a vibration threshold based on a measured temperature of a mechanical part. The vibration threshold can characterize an amount of vibration associated with a standard operating condition of the mechanical part.

According to an embodiment, a computer-implemented method is provided. The computer-implemented method can comprise updating, by a system operatively coupled to a processor, a predictive failure algorithm by altering a vibration threshold based on a measured temperature of a mechanical part. The vibration threshold can characterize an amount of vibration associated with a standard operating condition of the mechanical part.

According to an embodiment, a computer program product for determining an operating condition of a mechanical part is provided. The computer program product can comprise a computer readable storage medium having program instructions embodied therewith. The program instructions can be executable by a processor to cause the processor to update, by the processor, a predictive failure algorithm by altering a vibration threshold based on a measured temperature of the mechanical part. The vibration threshold can characterize an amount of vibration associated with a standard operating condition of the mechanical part.

DETAILED DESCRIPTION

Figure 1:
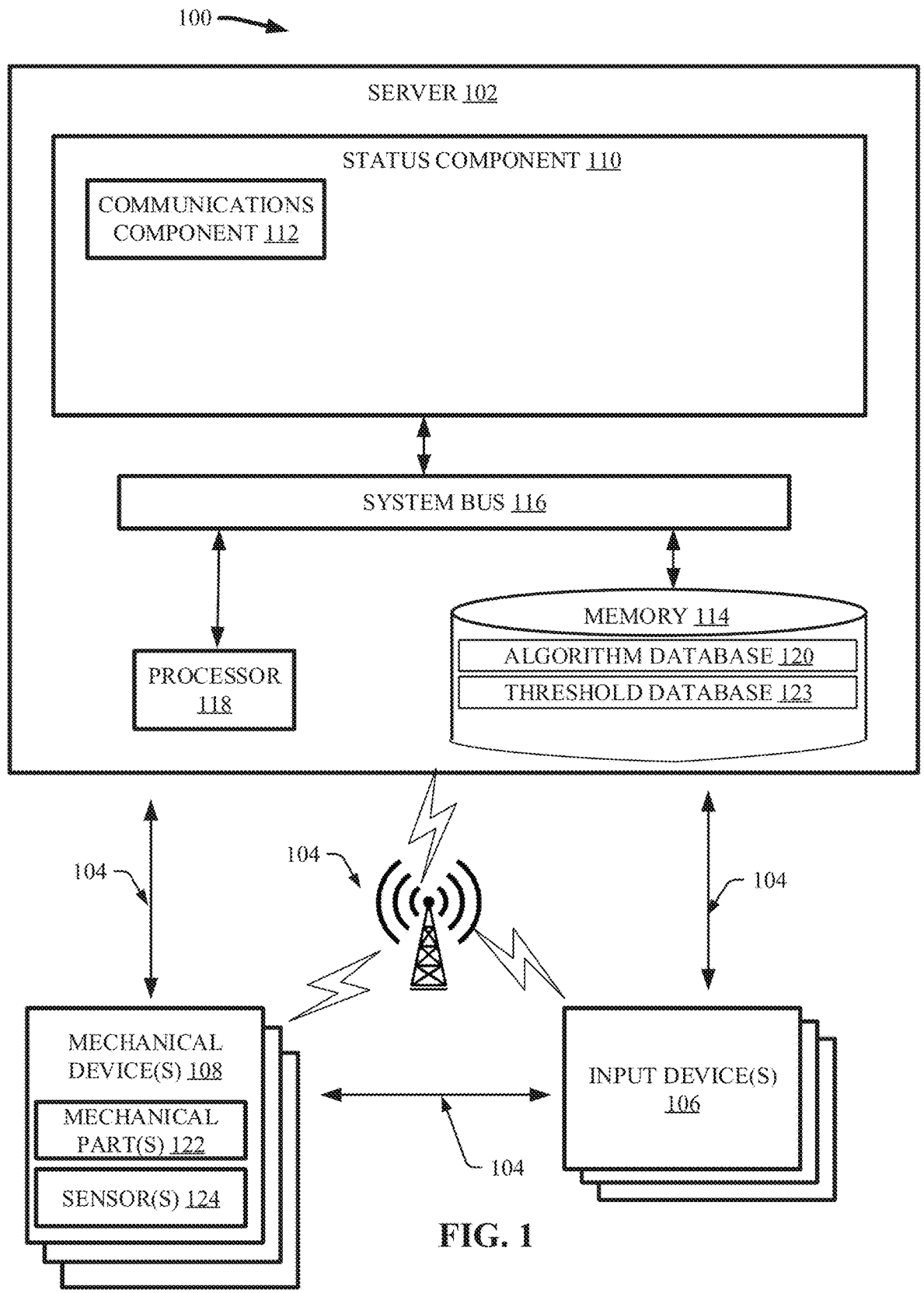
FIG. 1 illustrates a block diagram of an example, non-limiting system that can monitor the status of one or more mechanical parts via one or more predictive failure algorithms in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

During the operation of a mechanical device, one or more parts can degrade over time due to wear and tear. Predicting the lifetime of the parts prior to an operational failure can enable users to avoid faulty operations. Additionally, predicting part failure can direct maintenance operations that can extend the useful operation of the parts. Traditionally, algorithms to predict the part failure have been developed; however, predictive failure algorithms are based on standardized tests that fail to account for the specific operating characteristics, and/or operating history, of the given mechanical device.

Various embodiments of the present invention can be directed to computer processing systems, computer-implemented methods, apparatus and/or computer program products that facilitate the efficient, effective, and autonomous (e.g., without direct human guidance) predicting of mechanical device malfunctions at various temperature ranges. For example, one or more embodiments described herein can monitor the temperature experienced by one or more parts during operation in addition to an amount of vibration experienced by the one or more parts at the temperature. Based on the monitored temperature and amount of vibration, various embodiments described herein can regard updating an initial predictive failure algorithm to more accurately account for the operating condition of the mechanical device. In various examples, the mechanical device can be an oven, wherein temperature changes induced by operation of the oven can influence how vibration levels of an operating oven part impact a malfunction prediction.

The operational lifetime of a mechanical part can vary based on one or more contexts of its operation. Part manufactures can employ one or more stress tests to determine a function of operation parameters that predicts a malfunction of the mechanical part. However, the effects of the operation parameters on the malfunction prediction can be vary based on one or more parameter correlations not accounted for by the stress test, and thereby not included in the initial predictive failure analysis. In various embodiments described herein, a correlation between temperature and vibration experienced by the mechanical part can influence the malfunction prediction. For instance, vibration levels experienced by a mechanical part can be markedly different at various operating temperature ranges. Thereby, vibration level thresholds that can be indicative of a future failure can also be markedly different at various operating temperatures. A predictive failure analysis that does not adjust for how the vibration levels are interpreted based on the operating temperature inherently integrates an amount of inaccuracy to any predictions regarding an operating temperature outside the predefined temperature range. Thus, the accuracy of a predictive failure analysis can be improved by accounting for the correlation between experienced vibration and temperature for a given part. Further, this improved predictive analysis can be particularly relevant to mechanical devices prone to experience temperature fluctuations, such as ovens and/or furnaces.

The computer processing systems, computer-implemented methods, apparatus and/or computer program products employ hardware and/or software to solve problems that are highly technical in nature (e.g., predict failure analyses), that are not abstract and cannot be performed as a set of mental acts by a human. For example, an individual, or a plurality of individuals, cannot continuously, or near continuously, monitor the condition of mechanical parts during their operation without interfering with the function of the associate mechanical device.

Also, one or more embodiments described herein can constitute a technical improvement over conventional predictive failure analyses by incorporating the effects of an interdependency between vibration levels and operating temperatures experienced by mechanical parts. Additionally, various embodiments described herein can demonstrate a technical improvement over conventional predictive failure analyses by adjusting the impact that observed vibration levels have on the predictive failure analysis of an mechanical part based on operating temperature. Further, one or more embodiments described herein can have a practical application by accurately predicting one or more malfunctions associated with a mechanical part prone to experience temperature fluctuations during its operational history. For instance, various embodiments described herein can facilitate a predictive failure analysis associated with one or more oven parts based on a correlation between vibration levels experienced by the oven parts and the operating temperature of the oven parts.

FIG. 1 illustrates a block diagram of an example, non-limiting system 100 that can perform one or more predictive failure analyses. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.) can cause the machines to perform the operations described.

As shown in FIG. 1, the system 100 can comprise one or more servers 102, one or more networks 104, input devices 106, and/or mechanical devices 108. The server 102 can comprise status component 110. The status component 110 can further comprise communication component 112. Also, the server 102 can comprise or otherwise be associated with at least one memory 114 (e.g., one or more volatile or non-volatile memory devices). The server 102 can further comprise a system bus 116 that can couple to various components such as, but not limited to, the status component 110 and associated components, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or mechanical devices 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. In various embodiments, the various components of system 100 can communicate with each other via one or more satellitia and/or cellular networks 104. For example, the one or more networks 104 can be one or more wireless cellular networks comprising cellular data technology that can facilitate communication between: the server 102 and the input devices 106 (and vice versa), the server 102 and the mechanical devices 108 (and vice versa), and/or the input devices 106 and the mechanical devices 108 (and vice versa). For instance, FIG. 1 depicts an exemplary embodiment in which the one or more networks 104 can be wireless cellular networks (e.g., represented by the tower icon) and/or direct electrical connections (e.g., represented by the double arrow lines); however, the architecture of the one or more networks 104 is not so limited. In various embodiments, the one or more networks 104 can include any of the wired or wireless technology described herein. Further, although in the embodiment shown the status component 110 can be provided on the one or more servers 102, it should be appreciated that the architecture of system 100 is not so limited. For example, the status component 110, or one or more components of status component 110, can be located at another computer device (e.g., another server device, a client device, etc.).

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more predictive failure algorithms into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the one or more mechanical devices 108 and/or the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the one or more input devices 106 can be employed to enter one or more predictive failure algorithms into the system 100. For example, the one or more predictive failure algorithms can be received by the communications component 112 and stored in the one or more memories 114. For instance, the one or more predictive failure algorithms can be stored in one or more algorithm databases 120. The one or more predictive failure algorithms can regard one or more mechanical parts 122 of the one or more mechanical devices 108. In various embodiments, the status component 110 can employ the one or more predictive failure algorithms to determine an operating status of the one or more mechanical parts 122. For example, the status component 110 can employ the one or more predictive failure algorithms to determine the likelihood of an imminent malfunction of the one or more mechanical parts 122.

In various embodiments, each predictive failure algorithm comprised within the algorithm database 120 can be associated with a respective mechanical part 122. Alternatively, in one or more embodiments, a predictive failure algorithm can be employed by the status component 110 with regards to multiple types of mechanical parts 122. For instances, a single predictive failure algorithm can be employed by the status component 110 with respect to a group of mechanical parts 122, wherein the mechanical parts 122 of the group share one or more commonalities that render the mechanical parts 122 applicable to the parameter relationships characterized by the predictive failure algorithm.

In various embodiments, the one or more input devices 106 can further be employed to control, and/or otherwise operate, the one or more mechanical devices 108. For example, the one or more input devices 106 can be employed to define one or more settings that guide operation of the mechanical devices 108. For instance, the one or more input devices 106 can be employed to activate or deactivate one or more mechanical parts 122 of the mechanical devices 108, set a run time for the one or more mechanical devices 108, and/or the like.

Further, the one or more input devices 106 can be employed to enter into the system 100 one or more values for one or more parameters of the one or more predictive failure algorithms. For instance, the one or more predictive failure algorithms can include parameters regarding the operation of the one or more mechanical parts 122. Example parameters regarding the operation can include, but are not limited to: the number of times the one or more mechanical parts 122 have been activated; the average run time of the one or more mechanical parts 122, an amount of work performed by the one or more mechanical parts 122, a combination thereof, and/or the like. In one or more embodiments, the one or more input devices 106 can be employed to manually enter the one or more parameter values to facilitate execution of the predictive failure algorithm.

In various embodiments, the one or more input devices 106 can generate a log of settings and/or commands sent to the one or more mechanical devices 108 so as to provide the parameter values autonomously. For example, the one or more input devices 106 can log each activation and/or deactivation of the mechanical parts 122 instructed by the input devices 106. Based on the log, the one or more input devices 106 can determine operation parameters such as, for example, the number of operations performed by the one or more mechanical parts 122 and/or the cumulative runtime of the one or more mechanical parts 122. Thereby, the one or more input devices 106 can share the operation parameters with the status component 110 to facilitate the execution of one or more predictive failure algorithms that utilize the operation parameters in the malfunction analysis.

In various embodiments, the one or more memories 114 can also store one or more threshold databases 123. The threshold databases 123 can include one or more threshold schemes that define vibration thresholds associated with one or more temperature ranges for a respective mechanical parts 122. For example, each mechanical part 122 can be associated with a threshold scheme. Further, each threshold scheme can include a plurality of temperature ranges. Each temperature range can be associated with a vibration threshold. The vibration threshold can define the amount of vibration experienced during normal operation of the respective mechanical part 122 when operating within the respective temperature range. In one or more embodiments, wherein the mechanical part 122 is experiencing an amount of vibration that is greater than the defined vibration threshold associated with the current operating temperature of the mechanical part 122, the mechanical part 122 may be experiencing a malfunction or may experience a malfunction imminently. Alternatively, in one or more embodiments, wherein the mechanical part 122 is experiencing an amount of vibration that is less than the defined vibration threshold associated with the current operating temperature of the mechanical part 122, the mechanical part 122 may be experiencing a malfunction or may experience a malfunction imminently.

In one or more embodiments, a threshold scheme can be associated with a plurality of mechanical parts 122. Alternatively, each mechanical part 122 can be associated with respective threshold schemes. The one or more input devices 106 can be employed to enter the one or more threshold databases 123 into the system 100 and/or to update the one or more threshold databases 123.

Although FIG. 1 depicts the one or more input devices 106 separate from the one or more mechanical devices 108, the architecture of the system 100 is not so limited. Embodiments in which the one or more input devices 106 are a part of the one or more mechanical devices 108 are also envisaged. Further, the one or more input devices 106 can communicate commands, settings, and/or data with the one or more mechanical devices 108 via one or more direct electrical connections and/or networks 104.

The one or more mechanical devices 108 can be devices, apparatuses, and/or systems that employ one or more principals of mechanical engineering to perform a defined task. Example mechanical devices 108 that can be analyzed by the system 100 can include, but are not limited to: ovens, furnaces, a combination thereof, and/or the like. In various embodiments, the one or more mechanical devices can include one or more mechanical parts 122 and/or sensors 124. The one or more mechanical parts 122 can be various mechanical components comprised within the mechanical devices 108 that can facilitate operation of the mechanical devices 108 and/or performance of the defined task. Example mechanical parts 122 can include, but are not limited to: motors, fans, bearings (e.g., friction reducing devices such as ball bearings, roller bearings, plane bearings, sleeve bushings, and/or the like), rotaries, belts, pullies, clutches, bushings, gears, fasteners, chains, sprockets, rods, seals, springs, blowers, exhaust systems (e.g., exhaust manifolds), conveyers, industrial hardware, heating elements, a combination thereof, and/or the like.

The one or more sensors 124 can monitor, measure, and/or otherwise observe one or more characteristics of the one or more mechanical parts 122 during operation of the one or more mechanical devices 108. The one or more characteristics can serve as parameters in the one or more predictive failure algorithms. For example, the one or more sensors 124 can measure at least the temperature of the one or more mechanical parts 122 during operation of the one or more mechanical devices 108. Additionally, the one or more sensors 124 can measure an amount of vibration experienced by the one or more mechanical parts 122 during operation of the one or more mechanical devices 108. Example types of sensors 124 can include, but are not limited to: thermometers (e.g., liquid or gas-filled thermometers, bimetal thermometers, electronic thermometers, thermistors, infrared thermometers, laser thermometers, and/or the like), vibration sensors (e.g., displacement sensors, velocity sensors, accelerometers, strain gauges, gyroscopes, laser displacement sensors, capacitive displacement sensors, vibration meters, vibration data loggers, and/or the like), a combination thereof, and/or the like.

In various embodiments, the one or more sensors 124 can be positioned adjacent to, and/or in contact with, the one or more mechanical parts 122. The one or more sensors 124 can monitor the one or more mechanical parts 122 throughout operation of the mechanical device 108, in response to a request generated by the status component 110 and/or the input devices 106, at defined time intervals, and/or in response to one or more triggering events. Additionally, the one or more sensors 124 can share one or more measurements and/or observations (e.g., temperature values and/or amounts of vibration) with the status component 110 via one or more direct electrical connections and/or networks 104.

Figure 2:
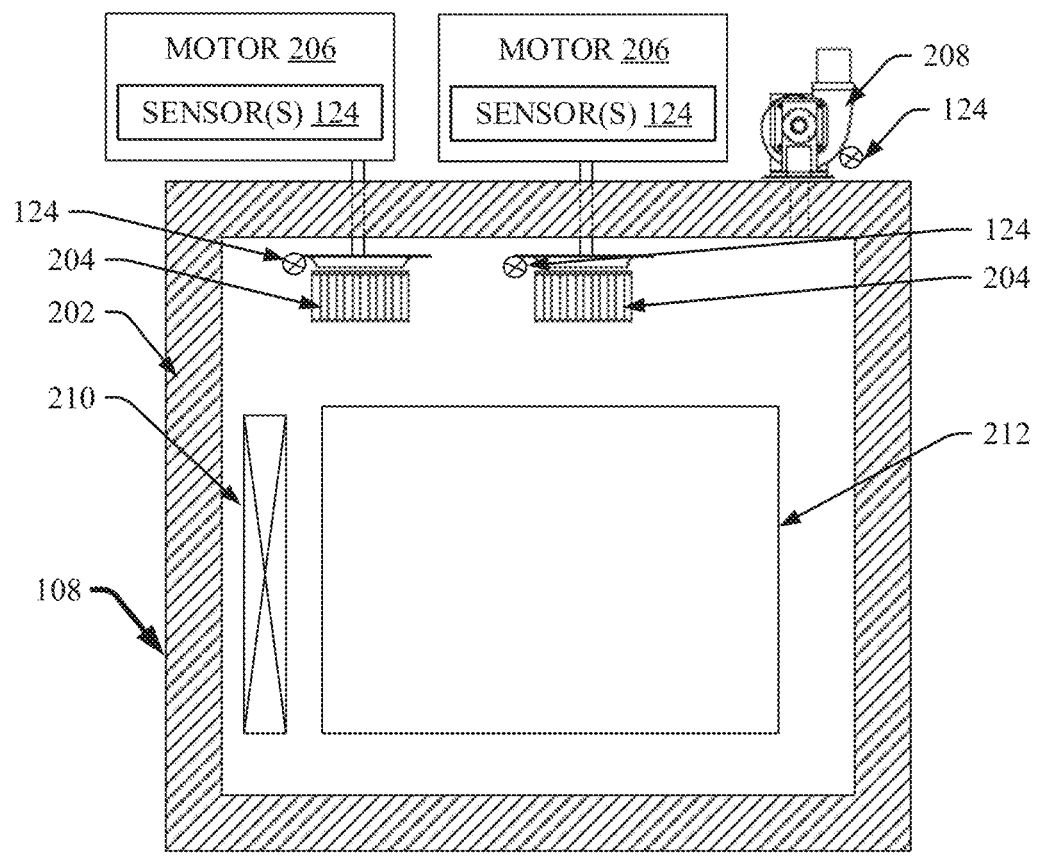
FIG. 2 illustrates a diagram of an example, non-limiting oven that can be included in one or more systems that monitor the status of one or more mechanical parts via one or more predictive failure algorithms in accordance with one or more embodiments described herein.

FIG. 2 illustrates a diagram of an example, non-limiting mechanical device 108, wherein the mechanical device 108 can be embodied as an oven and/or furnace in accordance with one or more embodiments described herein. Repetitive description of like elements employed in other embodiments described herein is omitted for sake of brevity. FIG. 2 depicts the mechanical device 108 as an oven to exemplify features of the various embodiments described herein; however, as described herein, other types of mechanical devices 108 are also envisaged. Additionally, the structure of the oven depicted in FIG. 2 is also exemplary, and alternate oven structures comprising mechanical parts 122 and/or sensors 124 are also envisaged. For example, the one or more mechanical devices 108 can be various types of ovens, including but not limited to: baking ovens, curing ovens, drying ovens, cleanroom ovens, batch production ovens, continuous production ovens, a combination thereof, and/or the like.

The mechanical parts 122 of an oven can be exposed to a range of temperature fluctuations due to the inherent heating and cooling operations. As the temperature of the mechanical parts 122 changes the amount of vibration exhibit by the mechanical parts 122 while operating can also change. In various embodiments described herein, the status component 110 can adjust a predictive failure algorithm associated with the given mechanical part 122 so as to account for the impact temperature has on how the mechanical part 122 vibrates.

As shown in FIG. 2, the exemplary oven can have an have an insulated body 202 that can house one or more mechanical parts 122. Additionally, one or more mechanical parts 122 can be positioned outside the insulated body 202. For example, the oven depicted in FIG. 2 can include one or more mechanical parts 122 such as fans 204, motors 206, exhaust devices 208, and/or heating elements 210. The one or more heating elements 210 can heat the ambient air adjacent to one or more heating chambers 212. Additionally, the one or more fans 204 can circulate the heated air around and/or into the one or more heating chambers 212. For example, the one or more fans can generate one or more horizontal, vertical, uniform, and/or non-uniform flows of heated air within the insulated body 202 and/or within the one or more heating chambers 212. Further, the one or more fans 204 can be operably coupled to one or more motors 206 (e.g., positioned outside of the insulated body 202, as shown in FIG. 2) that can drive operation of the fans 204. Moreover, one or more exhaust devices 208 can export heated air from the insulated body 202 to facilitate one or more cool-downs of the oven and/or achieve a set temperature within the one or more heating chambers 212.

During operation of the one or more mechanical devices 108, the one or more mechanical parts 122 can experience varying temperature changes. For example, during operation of the exemplary oven shown in FIG. 2, the one or more mechanical parts 122 (e.g., fans 204, motors 206, exhaust devices 208, and/or heating elements 210) can be heated and/or cooled. For instance, the one or more heating elements 210 can achieve a variety of temperatures as the heating elements 210 generate and/or dissipate heat. Likewise, the one or more fans 204 can experience elevated temperatures during operation due at least in part to contact with the heated air. Similarly, the one or more exhaust devices 208 can experience elevated temperatures during operation due at least in part to heated air being dispelled out of the insulated body 202. Additionally, the one or more motors 206 can experience elevated temperatures due to residual heat escaping from the insulated body 202, heated air exhausted from the insulated body 202, and/or ambient temperatures from the environment surrounding the insulated body 202. In one or more embodiments, one or more motors 206 (e.g., driving mechanical parts 122 and/or components other than the one or more fans 204) can be positioned inside the insulated body 202 and/or can experience elevated temperatures due to at least the heat generated by the one or more heating elements 210.

Additionally, during operation of the one or more mechanical devices 108, the one or more mechanical parts 122 can experience varying amounts of vibration. A defined amount of vibration can be expected during normal operation of the mechanical parts 122. However, abnormal amounts of vibration can be an indication of an existing malfunction or an imminent malfunction. For example, the one or more predictive failure algorithms can determine that a mechanical part 122 is experiencing a malfunction or is prone to experience a malfunction in the near future based on the amount of vibration exceeding a defined vibration threshold that characterizes normal operating amounts of vibration.

Further, the amount of vibration expected to be experienced during normal operation of the mechanical parts 122 can vary based on the temperature of the mechanical parts 122. Thereby, a mechanical part 122 can be associated with respective vibration thresholds for respective temperature ranges. For example, at a first temperature, an amount of vibration experienced by a mechanical part 122 can be determine to be within a range associated with normal operation; whereas at a second temperature, the same amount of vibration can be determined to be outside the range associated with normal operation. Thus, the temperature of the mechanical parts 122 can affect how much vibration the mechanical parts 122 experiences during normal operation, and thereby can affect how a predictive failure algorithm determines the presence and/or imminence of a malfunction.

Moreover, amount of vibration experienced during normal operation can vary between respective mechanical parts 122. Likewise, the vibration thresholds associated with respective temperature ranges can vary between mechanical parts. 122. For example, the amount of vibration experienced during normal operation of a fan 204 at a given temperature can be different than the amount of vibration experienced during normal operation of a motor 206 at the given temperature. Additionally, the type of mechanical device 108 housing the mechanical part 122 can influence the amount of normal operating vibration. For example, mechanical devices 108 performing different tasks can be subjected to different amounts of vibration during normal operation.

As shown in FIG. 2, the mechanical device 108 (e.g., an oven) can include the one or more sensors 124 positioned adjacent to, in contact with, and/or comprised within the one or more mechanical parts 122. As described herein, the one or more sensors 124 can measure the temperature and/or vibration experienced by the mechanical parts 122. In one or more embodiments, each mechanical part 122 can be observed by one or more respective temperature sensors 124 and vibration sensors 124. In some embodiments, a plurality of mechanical parts 122 can be observed by a shared sensor 124. For example, a single temperature sensor 124 can measure the temperature of multiple mechanical parts 122 in a defined proximity to the temperature sensor 124.

Figure 3:
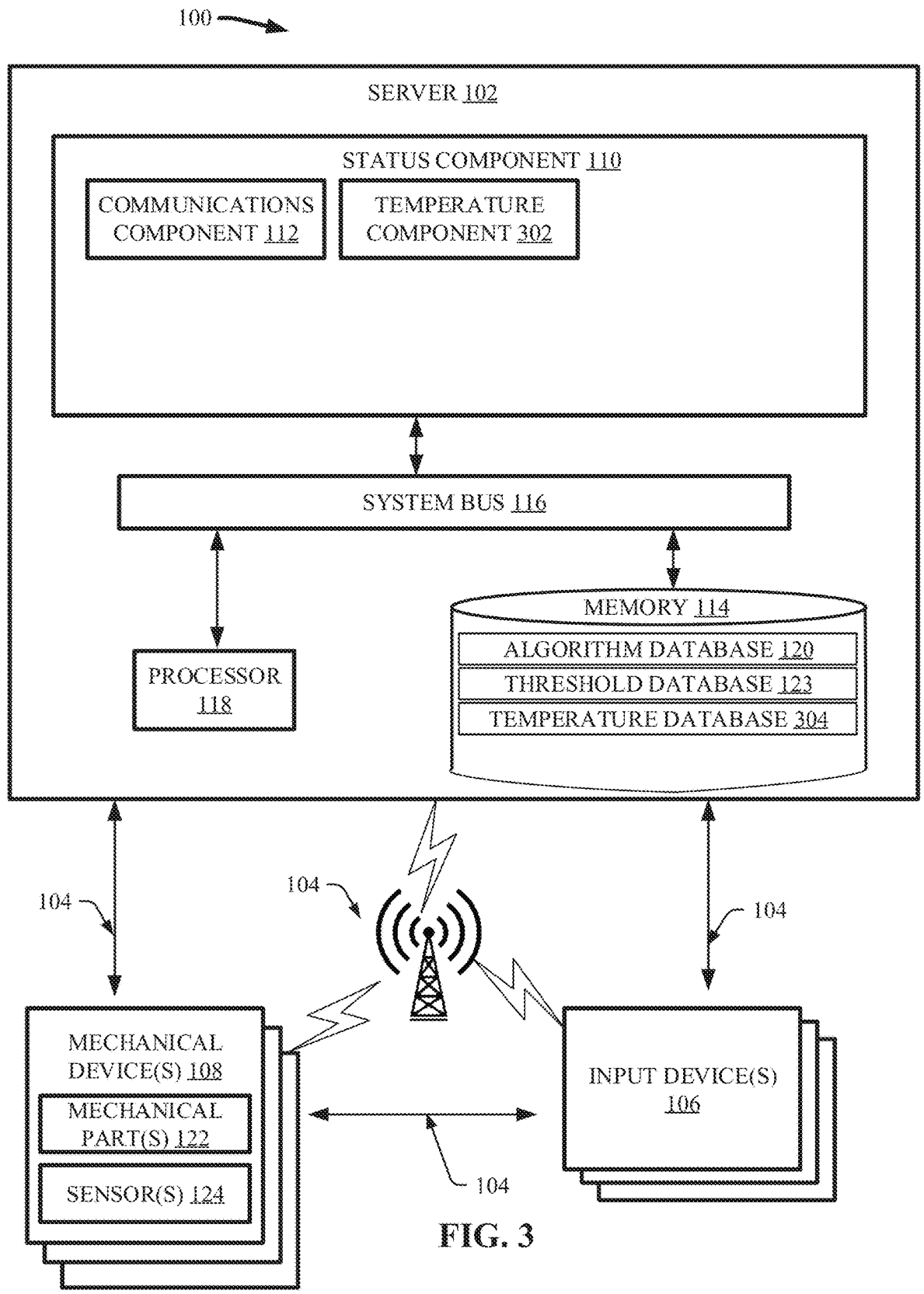
FIG. 3 illustrates a diagram of an example, non-limiting system that can measure a temperature value of one or more mechanical parts during operation to facilitate a predictive failure algorithm in accordance with one or more embodiments described herein.

FIG. 3 illustrates a diagram of the example, non-limiting system 100 further comprising temperature component 302 in accordance with one or more embodiments described herein. Repetitive description of like elements employed in other embodiments described herein is omitted for sake of brevity. In various embodiments, the temperature component 302 can determine the temperature of the one or more mechanical parts 122 based on one or more temperature measurements performed by the one or more sensors 124. The temperature component 302 can communicate with the one or more sensors 124 via a direct electrical connection and/or the network 104 (e.g., via communications component 112).

In one or more embodiments, the one or more sensors 124 can collect temperature data characterizing the temperature of the one or more mechanical parts 122 in accordance with one or more of the following temperature collection schemes. In a first exemplary temperature collection scheme, the one or more sensors 124 can measure the temperature of the mechanical parts 122 continuously, or near continuously. In a second exemplary temperature collection scheme, the one or more sensors 124 can measure the temperature of the mechanical parts 122 in response to a triggering event. For example, a triggering event can be initiating operation of the one or more mechanical parts 122, the vibration of the mechanical parts 122 exceeding a defined threshold, and/or a temperature request generated by the temperature component 302. Following the triggering event, the one or more sensors 124 can measure the temperature of the one or more mechanical parts 122: continuously, or near continuously; in accordance with a defined time interval (e.g., a defined interval of seconds, minutes, hours, and/or the like); and/or in response to a second triggering event.

Additionally, the one or more sensors 124 can share the temperature data with the temperature component 302 in accordance with one or more of the following temperature sharing schemes. In a first exemplary temperature sharing scheme, the one or more sensors 124 can directly share the (e.g., stream) the temperature data to the temperature component 302. In a second exemplary temperature sharing scheme, the one or more sensors 124 can share the temperature data with the temperature component 302 in response to the measured temperature exceeding one or more defined temperature thresholds. For instances, one or more temperature thresholds can define a plurality of temperature ranges, wherein the one or more sensors 124 can share the temperature data with the temperature component 302 in response to the measured temperature transitioning from one temperature range to another. In a third exemplary temperature sharing scheme, the one or more sensors 124 can share the temperature data with the temperature component 302 in accordance with one or more time intervals (e.g., a defined interval of seconds, minutes, hours, and/or the like). Additionally, the one or more sensors 124 can share the temperature data with the temperature component 302 in response to one or more temperature requests generated by the temperature component 302.

In various embodiments, the temperature component 302 can further generate and/or update one or more temperature databases 304. As shown in FIG. 3, the one or more temperature databases 304 can be stored in the one or more memories 114. The one or more temperature databases 304 can include one or more temperature logs that include the measured temperatures associated with the mechanical parts 122. In one or more embodiments, the temperature database 304 can include a temperature log for each mechanical part 122. Additionally, the temperature component 302 can populate the temperature data collected from the one or more sensors 124 in the one or more temperature databases 304. For example, the temperature component 302 can populate the temperature log associated with a mechanical part 122 with the temperature data characterizing the mechanical part 122 in response to the temperature data being received from the one or more sensors 124. As the temperature component 302 collects additional temperature data from the one or more sensors 124, the temperature component 302 can update the temperature logs of the mechanical parts 122 characterized by the additional temperature data with the temperature data. In various embodiments, the temperature component 302 can time-stamp the temperature data in populating the one or more temperature logs included in the one or more temperature databases 304.

Figure 4:
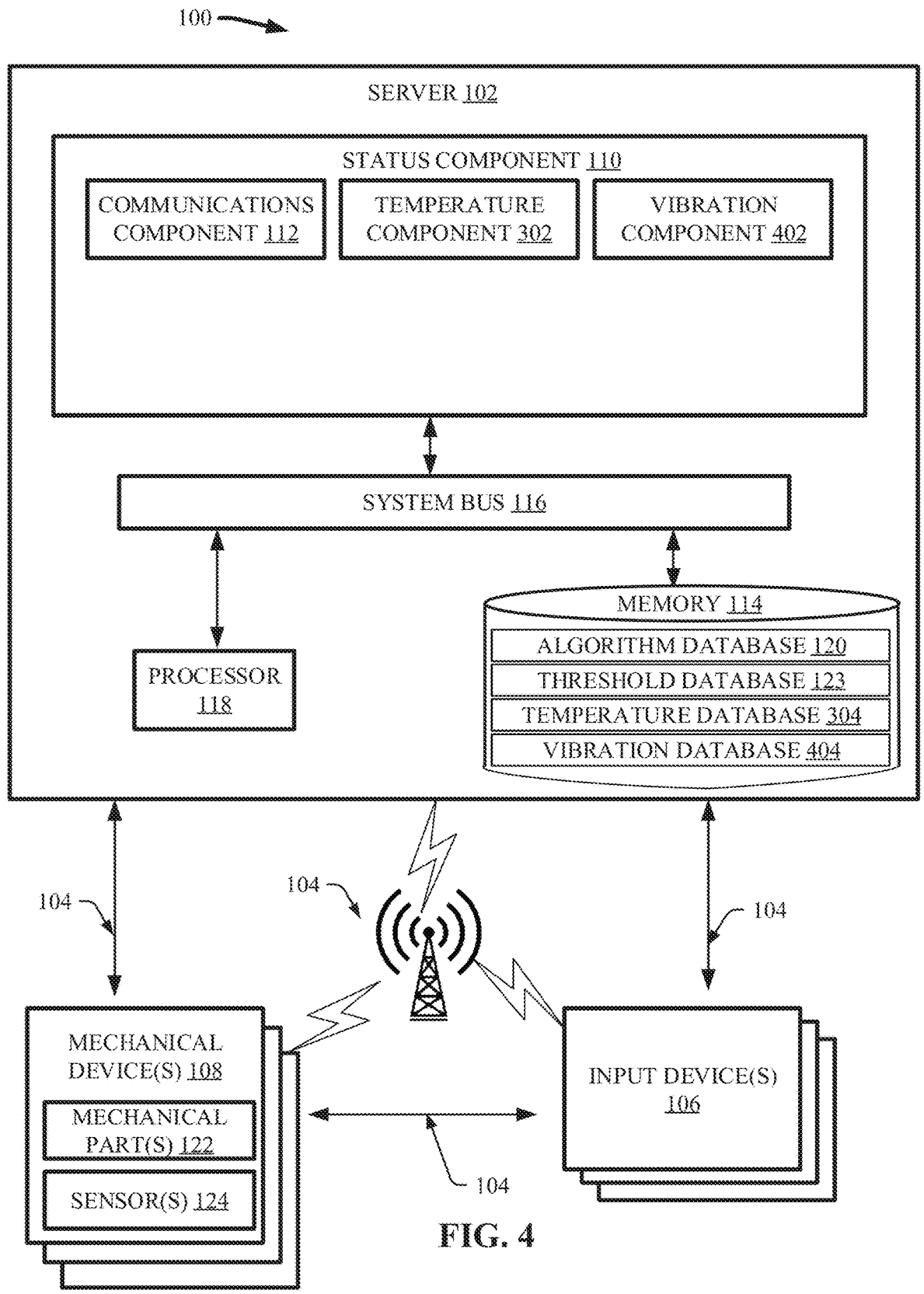
FIG. 4 illustrates a diagram of an example, non-limiting system that can measure an amount of vibration experienced by one or more mechanical parts during operation to facilitate a predictive failure algorithm in accordance with one or more embodiments described herein.

FIG. 4 illustrates a diagram of the example, non-limiting system 100 further comprising vibration component 402 in accordance with one or more embodiments described herein. Repetitive description of like elements employed in other embodiments described herein is omitted for sake of brevity. In various embodiments, the vibration component 402 can determine the amount of vibration associated with the one or more mechanical parts 122 based on one or more vibration measurements performed by the one or more sensors 124. The vibration component 402 can communicate with the one or more sensors 124 via a direct electrical connection and/or the network 104 (e.g., via communications component 112).

In one or more embodiments, the one or more sensors 124 can collect vibration data characterizing the amount of vibration being experienced by the one or more mechanical parts 122 in accordance with one or more of the following vibration collection schemes. In a first exemplary vibration collection scheme, the one or more sensors 124 can measure amount of vibration associated with (e.g., being experienced by) the mechanical parts 122 continuously, or near continuously. In a second exemplary vibration collection scheme, the one or more sensors 124 can measure the amount of vibration associated with (e.g., being experienced by) the mechanical parts 122 in response to a triggering event. For example, a triggering event can be initiating operation of the one or more mechanical parts 122, the temperature of the mechanical parts 122 exceeding a defined threshold, and/or a vibration request generated by the vibration component 402. Following the triggering event, the one or more sensors 124 can measure the amount of vibration associated with (e.g., being experienced by) the one or more mechanical parts 122: continuously, or near continuously; in accordance with a defined time interval (e.g., a defined interval of seconds, minutes, hours, and/or the like); and/or in response to a second triggering event.

Additionally, the one or more sensors 124 can share the vibration data with the vibration component 402 in accordance with one or more of the following vibration sharing schemes. In a first exemplary vibration sharing scheme, the one or more sensors 124 can directly share the (e.g., stream) the vibration data with the vibration component 402. In a second exemplary vibration sharing scheme, the one or more sensors 124 can share the vibration data with the vibration component 402 in response to the measured vibration exceeding one or more defined vibration thresholds. For instances, one or more vibration thresholds can define a plurality of vibration ranges, wherein the one or more sensors 124 can share the vibration data with the vibration component 402 in response to the measured amount of vibration transitioning from one vibration range to another. In a third exemplary vibration sharing scheme, the one or more sensors 124 can share the vibration data with the vibration component 402 in accordance with one or more time intervals (e.g., a defined interval of seconds, minutes, hours, and/or the like). Additionally, the one or more sensors 124 can share the vibration data with the vibration component 402 in response to one or more vibration requests generated by the vibration component 402.

In various embodiments, the vibration component 402 can further generate and/or update one or more vibration databases 404. As shown in FIG. 4, the one or more vibration databases 404 can be stored in the one or more memories 114. The one or more vibration databases 404 can include one or more vibration logs that include the measured amounts of vibration associated with the mechanical parts 122. In one or more embodiments, the vibration database 404 can include a vibration log for each mechanical part 122. Additionally, the vibration component 402 can populate the vibration data collected from the one or more sensors 124 in the one or more vibration databases 404. For example, the vibration component 402 can populate the vibration log associated with a mechanical part 122 with the vibration data characterizing the mechanical part 122 in response to the vibration data being received from the one or more sensors 124. As the vibration component 402 collects additional vibration data from the one or more sensors 124, the vibration component 402 can update the vibration logs of the mechanical parts 122 characterized by the additional vibration data with the vibration data. In various embodiments, the vibration component 402 can time-stamp the vibration data in populating the one or more vibration logs included in the one or more vibration databases 404.

Figure 5:
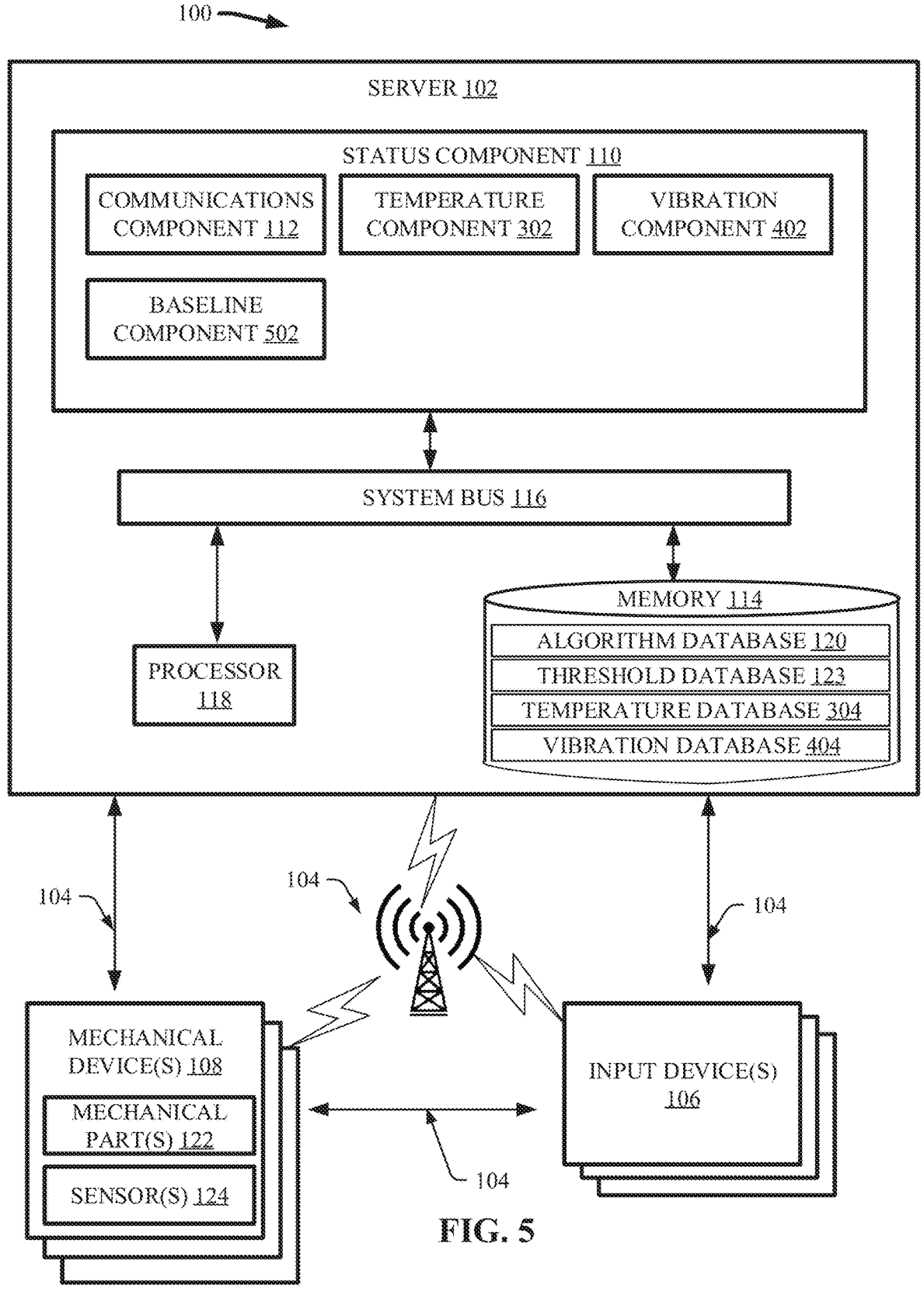
FIG. 5 illustrates a diagram of an example, non-limiting system that can determine one or more vibration baseline values that can characterize a standard operational condition of one or more mechanical parts in accordance with one or more embodiments described herein.

FIG. 5 illustrates a diagram of the example, non-limiting system 100 further comprising baseline component 502 in accordance with one or more embodiments described herein. Repetitive description of like elements employed in other embodiments described herein is omitted for sake of brevity. In various embodiments, the baseline component 502 can determine one or more vibration baseline values associated with respective mechanical parts 122 at respective temperature ranges. In one or more embodiments, the baseline component 502 can generate and/or alter the threshold schemes of the threshold database 123 based on the one or more vibration baseline values.

The baseline component 502 can monitor the temperature database 304 and/or the vibration database 404 to track the operational data of the one or more mechanical parts 122. For example, the baseline component 502 can track the amount of vibration experienced by a mechanical part 122 (e.g., and logged into the vibration database 404) over time to generate a statistical baseline determination. In one or more embodiments, the baseline component 502 can determine a moving average of the vibration data for a respective mechanical part 122 for each temperature range defined by the one or more temperature thresholds to generate the one or more vibration baseline values. The baseline component 502 can analyze the temperature and/or vibration data for the entire recorded history of the mechanical part 122 to determine the one or more vibration baseline values. Alternatively, the baseline component 502 can analyze the temperature and/or vibration data for a defined historic time period (e.g., a default time period, such as the most recent thirty days, and/or a time period defined by the one or more input devices 106).

The statistical vibration baseline value generated by the baseline component 502 can be based on the historic operational data (e.g., temperature data and/or vibration data stored in the temperature database 304 and/or vibration database 404) and can characterize an amount of vibration expected to be experienced by the mechanical part 122 during a normal operating condition at a given temperature range. Thereby, the baseline component 502 can analyze the historic operational data of a mechanical part 122 to determine the amount of vibration associated with standard operating condition of the mechanical part 122 at a given temperature range.

The baseline component 502 can further determine the one or more vibration thresholds for the threshold schemes of the threshold database 123 based on the vibration baseline value determinations. For example, the one or more vibration thresholds can be a defined amount of deviation from the associate vibration baseline value for the given temperature range. For instance, the vibration threshold associated with a given temperature range in a threshold scheme can be defined by the baseline component 502 as an amount of vibration experienced in excess of the vibration baseline value associated with the given temperature range. In another instance, the vibration threshold associated with a given temperature range in a threshold scheme can be defined by the baseline component 502 as amount of vibration not experienced by the mechanical part 122 in comparison to the vibration baseline value associated with the given temperature range.

In various embodiments, the baseline component 502 can update one or more vibration baseline values in accordance with a schedule or a triggering event. For example, the baseline component 502 can update the one or more vibration baseline values in response to one more new entries of operational data into the temperature database 304 and/or the vibration database 404. In another example, the baseline component 502 can update the one or more vibration baseline values in accordance with a fixed schedule (e.g., set via the one or more input devices 106). For instance, the baseline component 502 can generate one or more measurement requests that command the temperature component 302 and/or the vibration component 402 to collect new temperature data and/or vibration data to be added to the historic record and facilitate an updated vibration baseline value determination. In various embodiments, the vibration baseline values for a mechanical part 122 can change over time. For example, as the mechanical part 122 ages, the amount of acceptable vibration associated with standard operating condition can change in comparison to the mechanical part's 122 first use. For instance, the mechanical part 122 can be altered, adapted, and/or tuned over time through operation of the mechanical device 108.

In one or more embodiments, the same type and/or model mechanical part 122 can be comprised within a plurality of mechanical devices 108 in the system 100. In such cases, the baseline component 502 can analyze operational data of respective mechanical parts 122 of the given type and/or model across the mechanical devices 108 to generate a vibration baseline value for the mechanical part 122 type and/or model. Further, the baseline component 502 can use the vibration baseline value associated with the type and/or model to configure the threshold scheme for a mechanical part 122 that is of the given type and/or model. Thereby, the baseline component 502 can incorporate the operational data of other mechanical parts 122 of the same type and/or model as a given mechanical part 122 in determining the one or more vibration baseline values for the given mechanical part 122. Thus, where a mechanical part 122 is new, and thereby the operational data is limited, the baseline component 502 can determine the vibration baseline value based on the operational data of other mechanical parts 122 of the same type and/or model. Additionally, by aggregating operational data of a plurality of mechanical parts 122 of the same type and/or model, the baseline component 502 can employ a larger dataset in determining the one or more vibration baseline values and thereby increase an accuracy of the one or more vibration baseline values.

Figure 6:
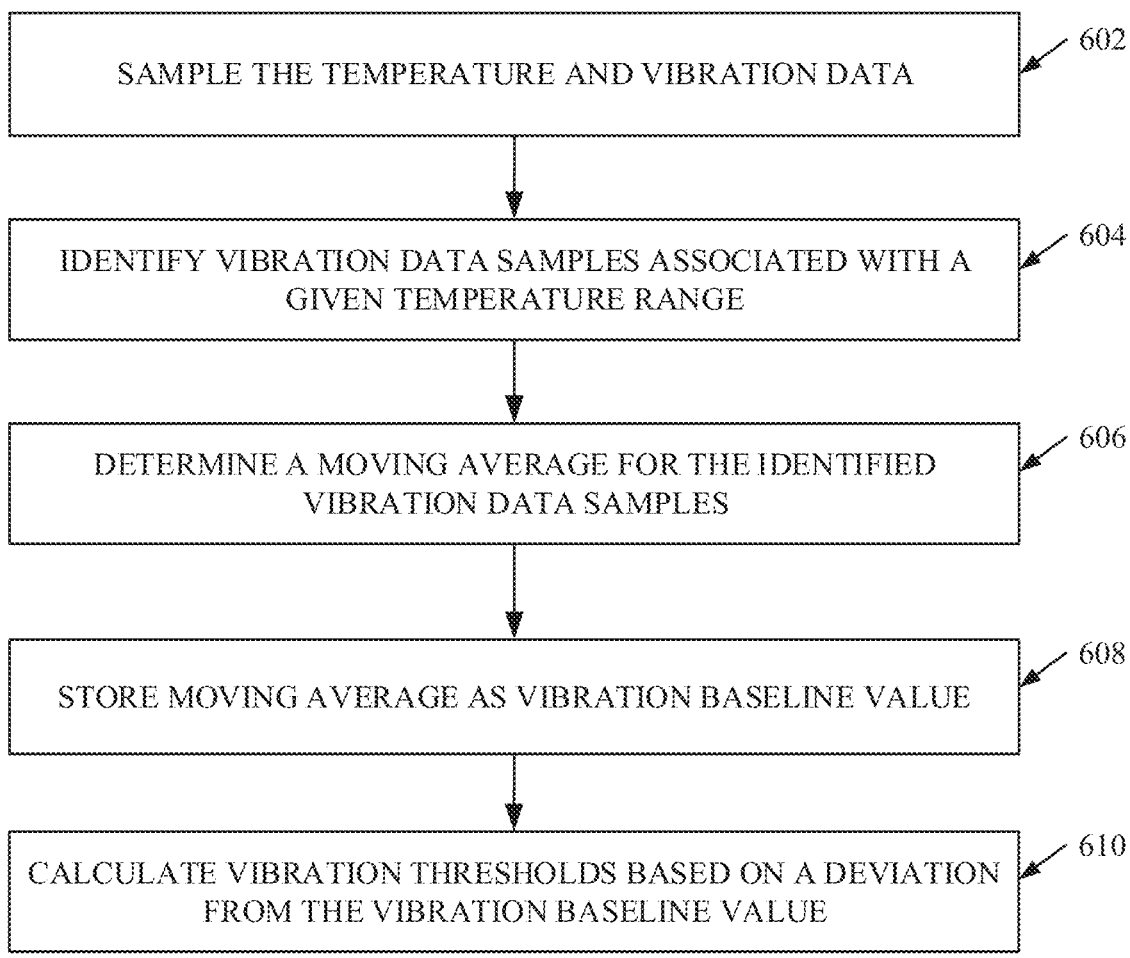
FIG. 6 illustrates a flow diagram of an example, non-limiting computer-implemented method that can facilitate determining one or more vibration baseline values that can characterize a standard operational condition of one or more mechanical parts in accordance with one or more embodiments described herein.

FIG. 6 illustrates a flow diagram of an example, non-limiting computer-implemented method 600 that can be implemented by the baseline component 502 in accordance with one or more embodiments described herein. Repetitive description of like elements employed in other embodiments described herein is omitted for sake of brevity. In various embodiments, the baseline component 502 can generate the one or more vibration baseline values in accordance with computer-implemented method 600.

At 602, the computer-implemented method 600 can comprise sampling the temperature and/or vibration data of the mechanical part 122. For example, the baseline component 502 can sample operational data characterizing the mechanical part 122 from the temperature database 304 and/or the vibration database 404. In various embodiments, the operational data can be timestamped to facilitate an association between temperature data and vibration data at a given moment.

At 604, the computer-implemented method 600 can comprise identifying vibration data samples associated with a given temperature range. For example, the baseline component 502 can link a vibration data sample to a corresponding temperature data sample based on at least the timestamps. Thereby, the baseline component 502 can further identify vibration data samples corresponding to temperature data samples that are within a defined temperature range. The temperature range can be defined, for example, via the one or more threshold schemes of the threshold database 123 and/or can be defined via the one or more input devices 106.

At 606, the computer-implemented method 600 can comprise determining a moving average for the vibration data samples identified at 604. The moving average can characterize a statistical baseline analysis. At 608, the computer-implemented method 600 can comprise storing (e.g., within one or more memories 114) the moving average as one or more vibration baseline values. At 610, the computer-implemented method 600 can comprise calculating one or more vibration thresholds based on a deviation from the one or more vibration baseline values. In one or more embodiments, the baseline component 502 can implement computer-implemented method 600 to determine the one or more vibration baseline values based on historic operational data of the mechanical parts 122. Further, the one or more vibration baseline values can characterize a standard amount of vibration experienced by the given mechanical part 122 at the given temperature range during standard operating condition.

In various embodiments, the baseline component 502 can repeat computer-implemented method 600 with regards to each temperature range defined in the threshold scheme associated with the given mechanical part 122. As described herein, the baseline component 502 can also repeat computer-implemented method 600 to update the one or more vibration baseline values in response to a defined scheduled and/or triggering event.

Figure 7:
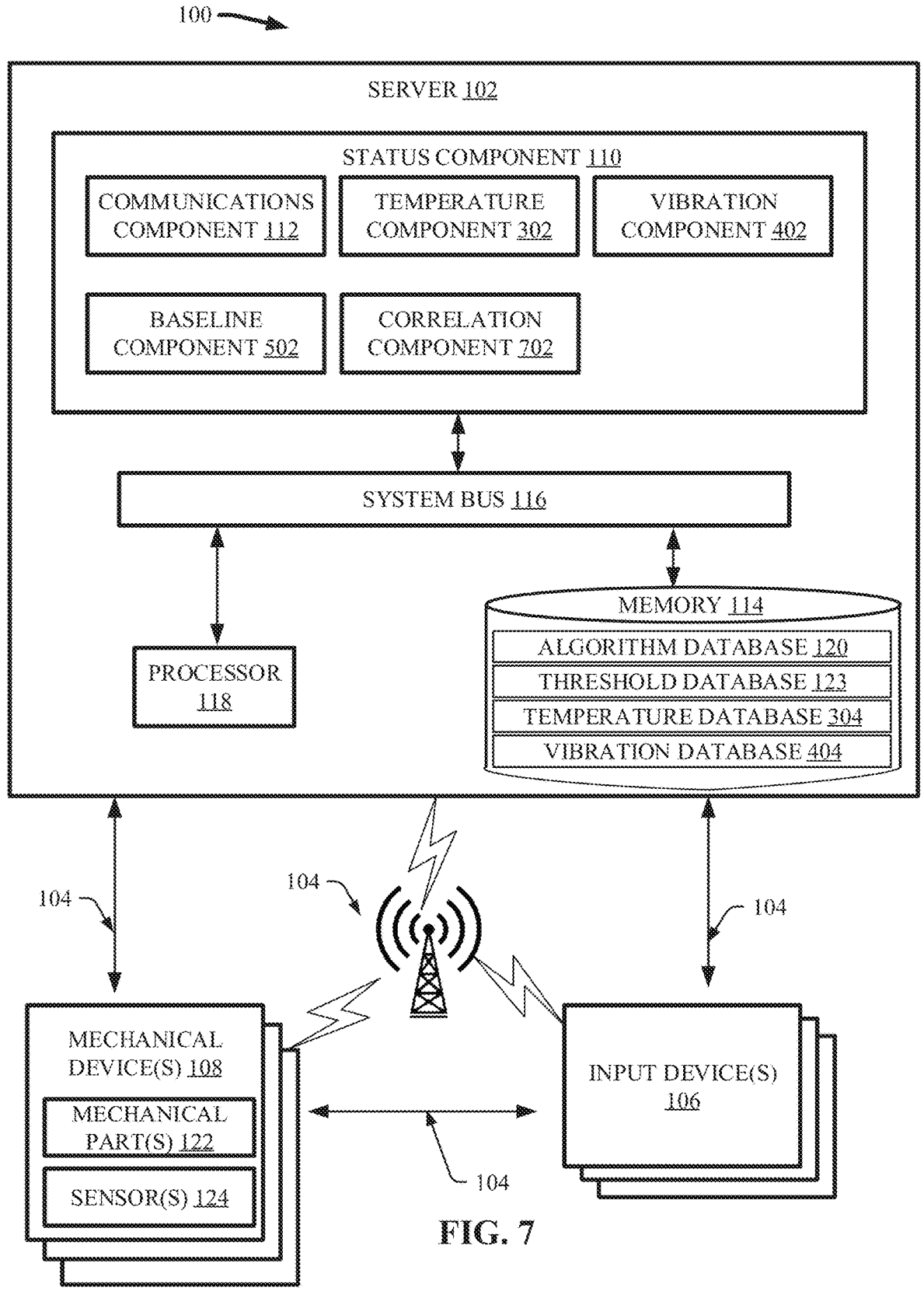
FIG. 7 illustrates a diagram of an example, non-limiting system that can correlate one or more predictive failure algorithms and/or vibration versus temperature relationships to one or more operating mechanical parts in accordance with one or more embodiments described herein.

FIG. 7 illustrates a diagram of the example, non-limiting system 100 further comprising correlation component 702 in accordance with one or more embodiments described herein. Repetitive description of like elements employed in other embodiments described herein is omitted for sake of brevity. In various embodiments, the correlation component 702 can correlate a predictive failure algorithm from the algorithm database 120 with a vibration threshold from the threshold database 123, temperature data from the temperature database 304, and vibration data from the vibration database 404 for one or more target mechanical parts 122.

As described herein, a mechanical part 122 can be associated with a predictive failure algorithm from the algorithm database 120, a threshold scheme from the threshold database 123, a temperature log from the temperature database 304, and/or a vibration log from the vibration database 404. For a given mechanical part 122, an associate predictive failure algorithm can define how vibration and temperature relate to each other, and/or other parameters, in performing a predictive failure analysis. The correlation component 702 can match the temperature and vibration data of mechanical part 122 to the predictive failure algorithm associated with the mechanical part 122 to facilitate execution of the predictive failure analysis. For example, the correlation component 702 can extract the latest temperature data from temperature log associated with the mechanical part 122 and/or the latest vibration data from the vibration log associated with the mechanical part 122. Additionally, the correlation component 702 can extract the appropriate vibration threshold from the threshold scheme associated with the mechanical part 122 based on the extracted latest temperature data.

In one or more embodiments, the correlation component 702 can analyze the time-stamp of the latest temperature data, vibration data, and/or vibration baseline values for the mechanical part 122 of interest. Wherein the temperature data, vibration data, and/or vibration baseline value is older than a defined age threshold, the correlation component 702 can instruct the temperature component 302, the vibration component 402, and/or the baseline component 502 to collect more recent temperature data, vibration data, and/or vibration baseline values for the correlation with the predictive failure algorithm. The age threshold can be a defined interval of time (e.g., an interval of seconds, minutes, hours, days, and/or like), and can be set, for example, by the one or more input devices 106. For example, wherein the age threshold is one minute and the most recent temperature data was collected and/or logged 2 minutes ago, the correlation component 702 can instruct the temperature component 302 to collect new temperature data from the one or more sensors 124 for the target mechanical part 122. In another example, wherein the age threshold is one minute and the most recent vibration data was collected and/or logged 2 minutes ago, the correlation component 702 can instruct the vibration component 402 to collect new vibration data from the one or more sensors 124 for the target mechanical part 122.

In various embodiments, the correlation component 702 can correlate the predictive failure data (e.g., temperature data, vibration data, threshold data, predictive failure algorithm) for one or more target mechanical parts 122 in response to one or more execution requests. For example, the one or more execution requests can be generated by one or more associate components of the status component 110 (e.g., temperature component 302, and/or vibration component 402) and/or the one or more input devices 106. The execution request can initiate execution of the associate predictive failure algorithm, and thereby can initiate one or more correlations by the correlation component 702. For instance, the temperature component 302 can generate an execution request in response to the measured temperature of a mechanical part 122 transitioning from one temperature range to another (e.g., wherein the temperature ranges can be delineated by the threshold scheme associated with the target mechanical part 122). In another instance, the vibration component 402 can generate an execution request in response to the measured amount of vibration experienced by the target mechanical part 122 transitioning outside of a vibration range (e.g., wherein the vibration range can be delineated by the threshold scheme associated with the target mechanical part 122). In a further instance, the one or more input devices 106 can be employed to generate an execution request on-demand. In one or more embodiments, the correlation component 702 can perform one or more correlations periodically in accordance with one or more schedules (e.g., defined by the one or more input devices 106).

Figure 8:
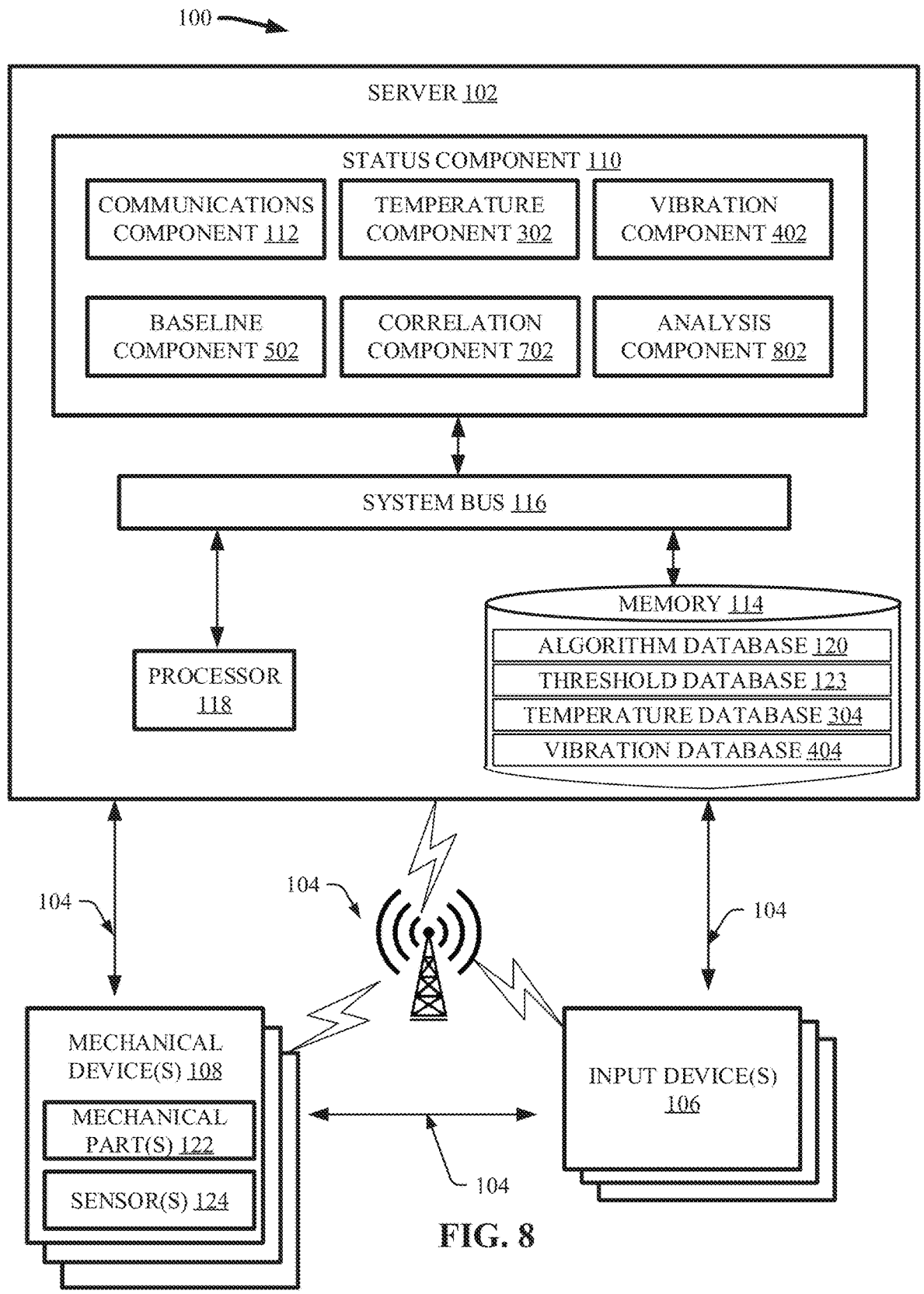
FIG. 8 illustrates a diagram of an example, non-limiting system that can update one or more initial predictive failure algorithms in accordance with one or more embodiments described herein.

FIG. 8 illustrates a diagram of the example, non-limiting system 100 further comprising analysis component 802 in accordance with one or more embodiments described herein. Repetitive description of like elements employed in other embodiments described herein is omitted for sake of brevity. In various embodiments, the analysis component 802 can analyze one or more target mechanical parts 122 by executing the associate predictive failure algorithm with the associate predictive failure data, such as the temperature data, vibration data, and/or threshold data correlated (e.g., by the correlation component 702) with the predictive failure algorithm.

In one or more embodiments, the analysis component 802 can update the predictive failure algorithm associated with the one or more target mechanical parts 122 with the temperature, vibration, and/or threshold data characterizing operation of the target mechanical parts 122 based on the correlations made by the correlation component 702. By executing the predictive failure algorithm with the updated data, the analysis component 802 can determine whether the one or more target mechanical parts 122 are experiencing a malfunction and/or are predicted to experience a malfunction in the near future.

In various embodiments, the analysis component 802 can update and execute the predictive failure algorithm in response to one or more execution requests generated by the associate components of the status component 110 and/or by the one or more input devices 106, as described herein. Additionally, the analysis component 802 can update and execute the predictive failure algorithm in accordance with one or more defined schedules (e.g., set by the one or more input devices 106). In one or more embodiments, the analysis component 802 can update and execute the predictive failure algorithm with respect to a first target mechanical part 122 in response to a malfunction determination resulting from execution of a predictive failure algorithm with respect to a second target mechanical part 122. For example, the malfunction, or imminent malfunction, of the second mechanical part 122 can be indicative of a problem in the mechanical device 108 that can lead to the malfunction, or imminent malfunction, of one or more other mechanical parts 122 (e.g., the first mechanical part 122). Thereby, the analysis component 802 can update and execute predictive failure algorithms with regards to a plurality of the mechanical parts 122 so as to elaborate upon the collective operating status of the mechanical device 108.

In one or more embodiments, the one or more predictive failure algorithms associated with the one or more target mechanical parts 122 can be initially calibrated for a default operating temperature. For example, the one or more predictive failure algorithms can assume that the operating temperature of the mechanical part 122 is a predefined temperature, such as room temperature. As described herein, the one or more mechanical parts 122 can be subjected to a variety of operating temperatures, which may differ from the predefined temperature used to initially calibrate the predictive failure algorithm. The analysis component 802 can compare the predefined temperature of the pre-calibrated predictive failure algorithm with the temperature data of the mechanical part 122 during operation (e.g., the operating temperature of the mechanical part 122).

Wherein the operating temperature of the mechanical part 122 and the predefined temperature of the pre-calibrated predictive failure algorithm are within the same temperature range delineated by the threshold scheme correlated to the mechanical part 122 (e.g., by correlation component 702), the analysis component 802 can execute the pre-calibrated predictive failure algorithm with the correlated temperature and/or vibration data. Wherein the operating temperature of the mechanical part 122 and the predefined temperature of the pre-calibrated predictive failure algorithm are within different temperature ranges, as delineated by the threshold scheme correlated to the mechanical part 122 (by correlation component 702), the analysis component 802 can update the predictive failure algorithm with the correlated vibration threshold (e.g., the vibration threshold associated with the threshold scheme temperature range that includes the operating temperature of the mechanical part 122). Thereby, the analysis component 802 can re-calibrate the predictive failure algorithm to account for vibration variances related to temperature. Subsequently, the analysis component 802 can execute the re-calibrated predictive failure algorithm using the correlated temperature and/or vibration data.

Figure 9:
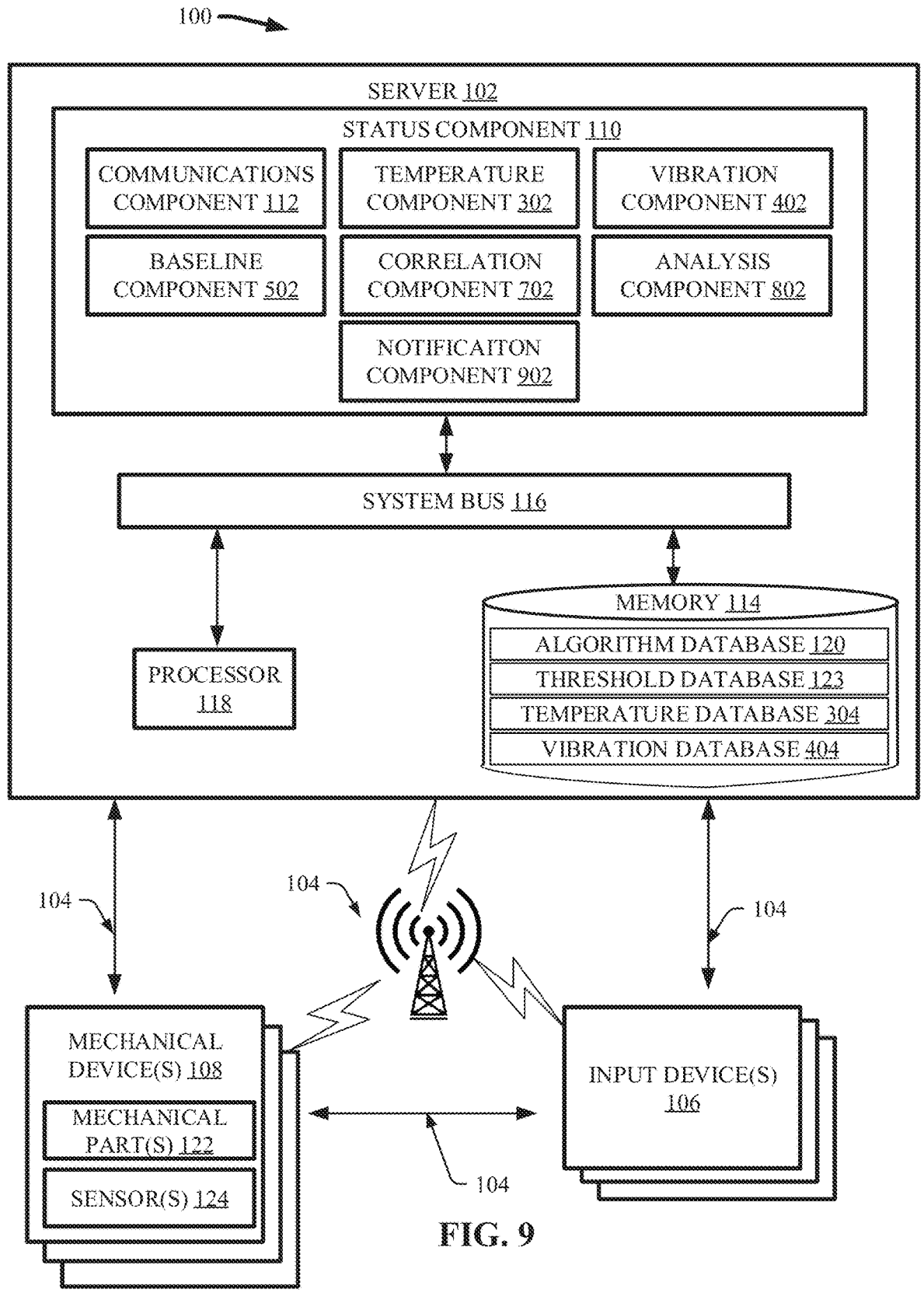
FIG. 9 illustrates a diagram of an example, non-limiting system that can generate one or more notifications regarding the status of one or more mechanical parts based on operation of the oven in accordance with one or more embodiments described herein.

FIG. 9 illustrates a diagram of the example, non-limiting system 100 further comprising notification component 902 in accordance with one or more embodiments described herein. Repetitive description of like elements employed in other embodiments described herein is omitted for sake of brevity. In various embodiments, the notification component 902 can generate one or more generate one or more notifications regarding results of the predictive failure algorithm executed by the analysis component 802.

In one or more embodiments, the one or more notifications can be generated describe one or more determinations made by the analysis component 802. For example, the one or more notifications can describe whether the analysis component 802 determined that the one or more target mechanical parts 122 are in normal operating condition, are experiencing a malfunction, and/or are predicted to experience a malfunction imminently. Further, the notification component 902 can store the one or more notifications (e.g., in the one or more memories 114) for later review. For example, the notification component 902 can generate a warning notification based on a determination by the analysis component 802 that the mechanical part 122 is likely to experience a malfunction in the near future. For instance, the analysis component 802 can execute the predictive failure algorithm to predict a trend in the future operational data of the mechanical part 122 that markedly deviates from one or more vibrational baseline values, whereupon the notification component 902 can generate a warning notification to alert a user of the system 100 to the mechanical part's 122 predicted malfunction. In another example, the notification component 902 can generate an alarm notification based on a determination by the analysis component 802 that the mechanical part 122 is currently, or imminently, experiencing a malfunction. In one or more embodiments, the notification component 902 can also share the one or more notifications with the one or more input devices 106 (e.g., via a direct electrical connection and/or the one or more networks 104). Thereby, an operating of the one or more mechanical devices 108 can employ the one or more input devices 106 to review one or more notifications generated by the status component 110 regarding the operating condition of one or more mechanical parts 122 included in the mechanical device 108.

Figure 10:
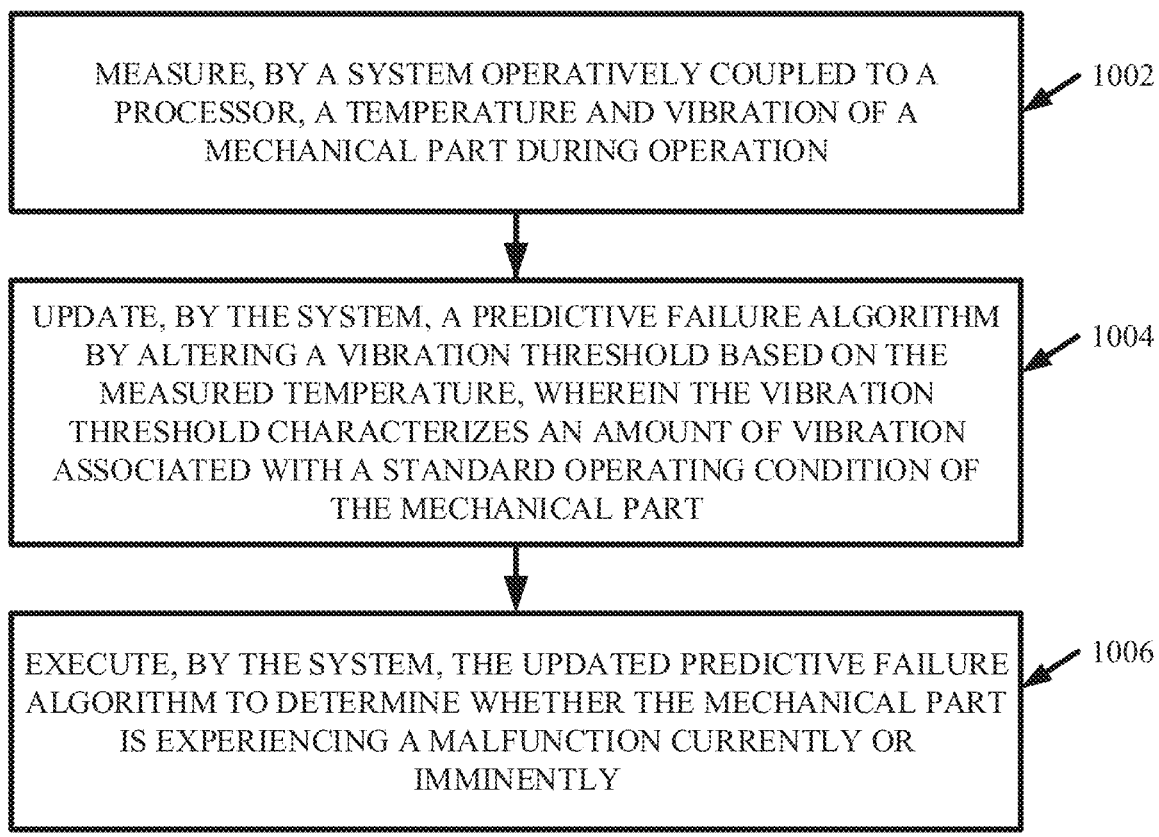
FIG. 10 illustrates a flow diagram of an example, non-limiting computer-implemented method that can facilitate monitoring the status of one or more mechanical parts via one or more predictive failure algorithms in accordance with one or more embodiments described herein.

FIG. 10 illustrates a flow diagram of an example, non-limiting computer-implemented method 1000 that can facilitate analyzing the operating status of one or more mechanical parts 122 in accordance with one or more embodiments described herein. Repetitive description of like elements employed in other embodiments described herein is omitted for sake of brevity.

At 1002, the computer-implemented method 1000 can comprise measuring (e.g., via temperature component 302 and/or vibration component 402), by a system 100 operatively coupled to a processor 118, a temperature and vibration of one or more mechanical parts 122 during operation. In accordance with various embodiments described herein, the one or more mechanical parts 122 can be comprised within one or more mechanical devices 108. For instance, the one or more mechanical parts 122 can include one or more fans 204, motors 206, exhaust devices 208, and/or heating elements 210 comprised within an oven. Also comprised within the one or more mechanical devices 108 can be one or more sensors 124 that can measure the temperature and/or amount of vibration experienced by the mechanical parts 122 during operation of the mechanical device 108. In accordance with various embodiments described herein, the temperature component 302 and/or vibration component 402 can collect the temperature data and/or vibration data measured by the sensors 124 and update one or more temperature logs and/or vibration logs associated with the mechanical parts 122.

At 1004, the computer-implemented method 1000 can comprise updating (e.g., via correlation component 702 and/or analysis component 802), by the system 100, one or more predictive failure algorithms by altering a vibration threshold based on the measured temperature. The vibration threshold can characterize an amount of vibration associated with a standard operating condition (e.g., normal operating condition) of the one or more mechanical parts 122. In accordance with the various embodiments described herein, the amount of vibration associated with normal operation of a mechanical part 122 can vary depending on the operating temperature of the mechanical part 122. For example, the operating temperatures can influence the amount of vibration experienced during normal operation of the mechanical parts 122. Thereby, an amount of vibration indicative of a mechanical part 122 malfunction at a first temperature can be indicative of a normal operating condition at a second temperature, and vice versa.

In various embodiments, each of the one or more mechanical parts 122 can be characterized by one or more threshold schemes (e.g., comprised within threshold database 123), which can delineate one or more vibration thresholds associated with respective operating temperature ranges. Based on the operating temperature measured at 802, the correlation component 702 can identify the appropriate vibration threshold associated with the measured operating temperature for the target mechanical part 122. Further, the analysis component 802 can update one or more predictive failure algorithms (e.g., identified and/or extracted from the algorithm database 120) with the identified vibration threshold; thereby calibrating the predictive failure algorithm to account for how the operating temperature of the mechanical parts 122 influence the amount of vibration experienced during normal operation. For instance, the altering the vibration threshold can include populating a vibration threshold parameter value of the predictive failure algorithm that was previously un-populated (e.g., wherein the predictive failure algorithm was not pre-calibrated based on a default temperature), or replacing an initial vibration threshold parameter value of the predictive failure algorithm with the identified vibration threshold (e.g., identified based on the operating temperature of the mechanical part 122 in accordance with the associate threshold scheme).

At 1006, the computer-implemented method 1000 can execute (e.g., via analysis component 802), by the system 100, the updated predictive failure algorithm to determine whether the one or more mechanical parts 122 are experiencing a malfunction currently or imminently. For example, the analysis component 802 can execute the updated predictive failure algorithm in response to an execution request generated by the temperature component 302, vibration component 402, and/or input devices 106. In various embodiments, the analysis component 802 can execute the updated predictive failure algorithm in accordance with a defined schedule. The results of the execution at 806 can guide one or more maintenance operations on the mechanical device 108.

Figure 11:
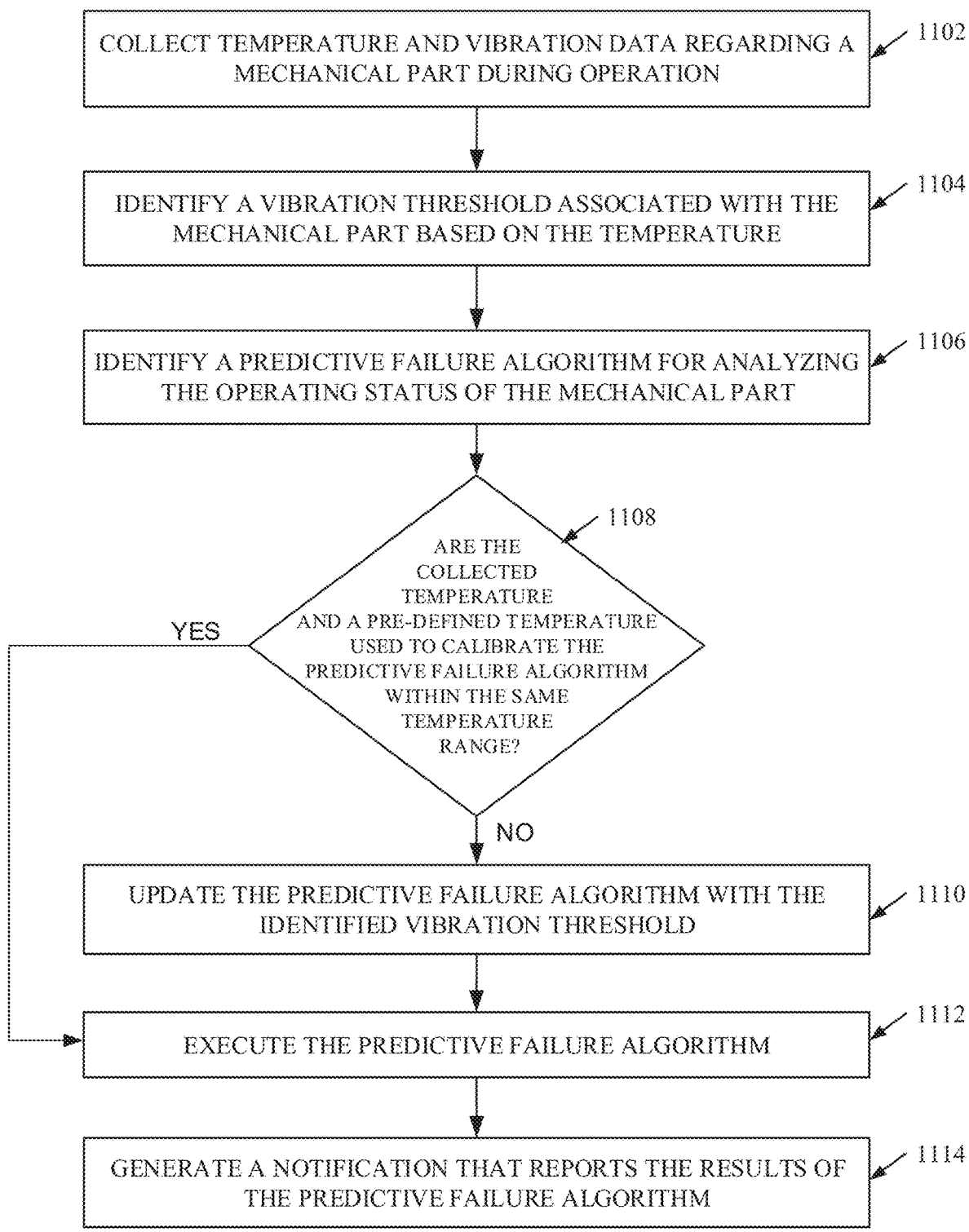
FIG. 11 illustrates a flow diagram of an example, non-limiting computer-implemented method that can facilitate monitoring the status of one or more mechanical parts via one or more predictive failure algorithms in accordance with one or more embodiments described herein.

FIG. 11 illustrates a flow diagram of an example, non-limiting computer-implemented method 1100 that can facilitate analyzing the operating status of one or more mechanical parts 122 in accordance with one or more embodiments described herein. Repetitive description of like elements employed in other embodiments described herein is omitted for sake of brevity. In accordance with various embodiments, the computer-implemented method 1100 can exemplify one or more features of the system 100 and/or computer-implemented method 1000.

At 1102, the computer-implemented method 1100 can comprise collecting (e.g., via temperature component 302 and/or vibration component 402), by a system 100 operatively coupled to a processor 118, temperature and vibration data regarding one or more mechanical parts 122 during operation. For example, the temperature component 302 and/or the vibration component 402 can collect the temperature and/or vibration data from one or more sensors 124 in response to one or more execution requests, triggering events, and/or schedules in accordance with one or more embodiments described herein. In various embodiments, the one or more mechanical parts 122 can be comprise within a mechanical device 108 prone to experience temperature fluctuations, such as an oven.

At 1104, the computer-implemented method 1100 can comprise identifying (e.g., via correlation component 702), by the system 100, a vibration threshold associated with the one or more mechanical parts 122 based on the temperature data collected at 902. For example, each mechanical part 122 can be associated with a respective threshold scheme included in the threshold database 123. The threshold scheme can include a plurality of vibration thresholds, each associated with a respective temperature range. Thereby, the correlation component 702 can compare the operating temperature data of the one or more mechanical parts 122 with the temperature ranges included in the threshold scheme to identify the vibration threshold associated with the operating temperature data.

At 1106, the computer-implemented method 1100 can comprise identifying (e.g., via correlation component 702), by the system 100, a predictive failure algorithm for analyzing the operating status of the one or more mechanical parts 122. For example, the correlation component 702 can identify the predictive failure algorithm from a plurality of predictive failure algorithms included within an algorithm database 120.

At 1108, the computer-implemented method 1100 can comprise determining (e.g., via analysis component 802), by the system 100, whether the collected temperature and a pre-defined temperature used to calibrate the predictive failure algorithm are within the same temperature range. The collected temperature (e.g., collected at 1102) can be the operating temperature of the one or more mechanical parts 122. As described herein, the predictive failure algorithms included in the algorithm database 120 can be initially calibrated based on a pre-defined temperature (e.g., room temperature). The analysis component 802 can analyze a threshold scheme (e.g., included in threshold database 123) to identify the defined temperature ranges of the one or more mechanical parts 122. Further, the analysis component 802 can determine which of the defined temperature ranges includes the collected temperature and which of the defined temperature ranges includes the pre-defined calibration temperature of the predictive failure algorithm. Wherein the collected temperature and the pre-defined calibration temperature are within the same defined temperature range (e.g., a "YES" determination), the computer-implemented method 1100 can skip step 1110 and proceed directly to step 1112. In contrast, wherein the collected temperature and the pre-defined calibration temperature are within in different defined temperature ranges (e.g., a "NO" determination), the computer-implemented method 1100 can proceed to step 1110.

At 1110, the computer-implemented method 1100 can comprise updating the predictive failure algorithm with the identified vibration threshold. For example, one or more vibration thresholds initially included in the predictive failure algorithm can be replaced with the vibration threshold identified at 1104. The one or more initial vibration thresholds can be based on the pre-defined calibration temperature, and thereby be associated with a defined temperature range that is outside the operating temperature collected at 1102. Thereby, the one or more initial vibration thresholds can inaccurately characterize permissible amounts of operating vibration as compared to the vibration threshold identified at 1104. Thus, the analysis component 802 can improve the accuracy of the predictive failure algorithm with regards to the particular operating temperature being experienced by the mechanical part 122 by updating the predictive failure algorithm with the identified vibration threshold (e.g., in accordance with the associate vibration scheme).

At 1112, the computer-implemented method 1100 can comprise executing (e.g., via analysis component 802), by the system 100, the predictive failure algorithm. For example, the non-updated predictive failure algorithm can be executed at 1112 in response to a "YES" determination at 1108, or the updated predictive failure algorithm can be executed at 1112 in response to a "NO" determination at 1108 and the updating at 1110. By executing the predictive failure algorithm, the analysis component 802 can determine whether the one or more mechanical parts 122 are experiencing a malfunction and/or predict whether the one or more mechanical parts 122 are expected to experience a malfunction imminently. At 1114, the computer-implemented method 1100 can comprise generating (e.g., via notification component 702), by the system 100, one or more notifications that can report the results of the execution at 1112. In accordance with various embodiments described herein, the one or more notifications can be shared with one or more input devices 106 to alert an operator of the mechanical device 108 to the operational status of the one or more mechanical parts 122.

Figure 12:
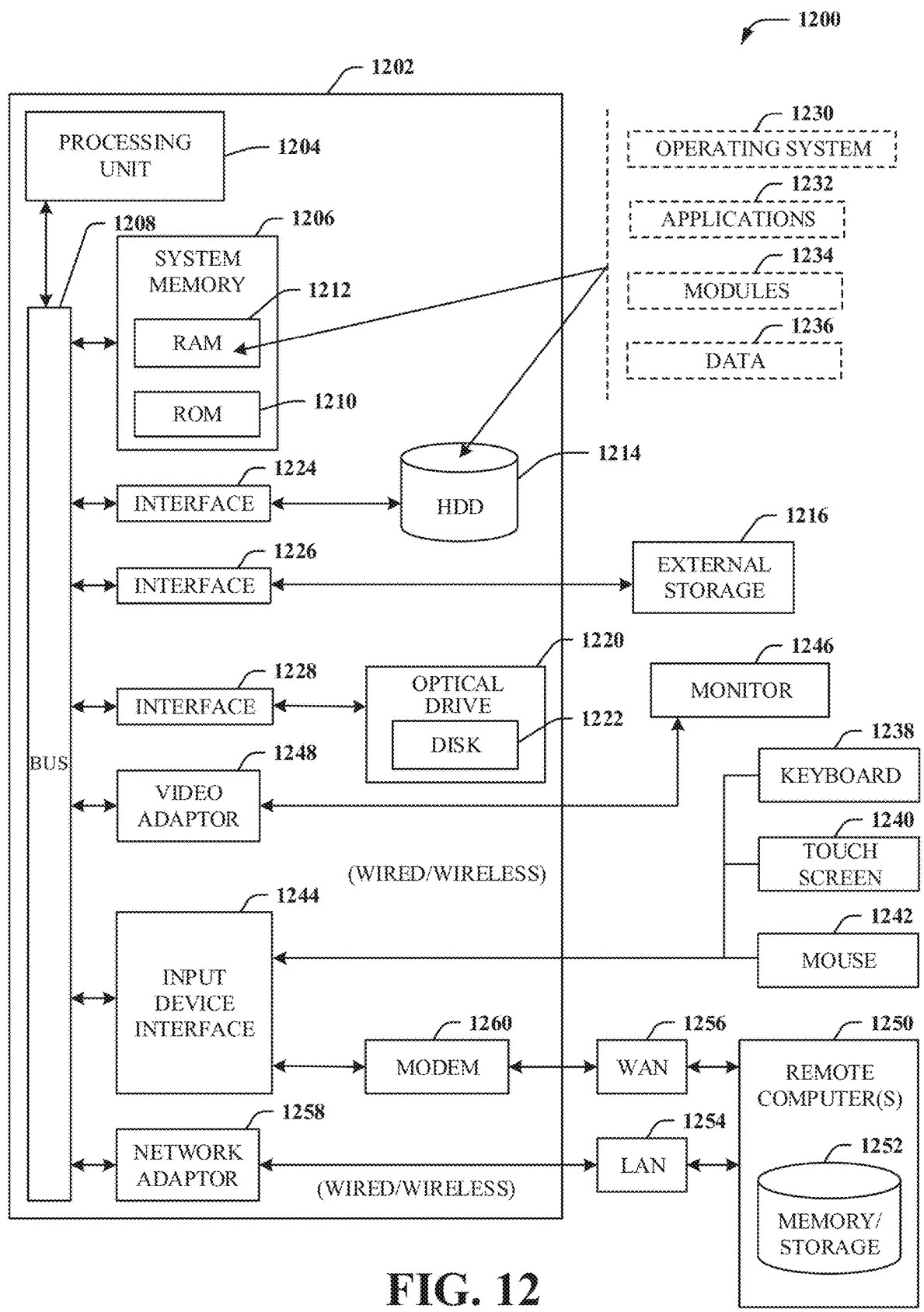
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor, operably coupled to the memory, and that executes the computer executable components stored in the memory, wherein the computer executable components comprise:
        a correlation component that compares a measured temperature of a mechanical part with a threshold scheme associated with the mechanical part to identify a target vibration threshold of the threshold scheme, wherein the threshold scheme comprises a plurality of temperature ranges with a corresponding plurality of vibration thresholds and wherein the comparing identifies the target vibration threshold from the plurality of vibration thresholds by identifying a temperature range from the plurality of temperature ranges that encompasses the measured temperature; and
        a status component that updates a predictive failure algorithm by altering the target vibration threshold based on the measured temperature of a mechanical part, wherein the vibration threshold represents an amount of vibration associated with a standard operating condition of the mechanical part within a defined temperature range of the measured temperature.

2. The system of claim 1, further comprising:
    a temperature sensor that measures a temperature of the mechanical part during operation of the mechanical part; and
    a vibration sensor that measures a vibration experienced by the mechanical part during the operation of the mechanical part.

3. The system of claim 1, further comprising:
    a temperature component that collects the measured temperature and populates a temperature log associated with the mechanical part with the measured temperature as time-stamped temperature data; and
    a vibration component that collects a measured vibration experienced by the mechanical part and populates a vibration log associated with the mechanical part with the measured vibration as time-stamped vibration data.

4. The system of claim 3, further comprising:
    a baseline component that generates a threshold scheme that characterizes a standard operating condition of the mechanical part based on the temperature log and the vibration log.

5. The system of claim 3, wherein the correlation component extracts temperature data from the temperature log based on a defined interval of time.

6. The system of claim 5, further comprising:
    an analysis component that alters the vibration threshold of the predictive failure algorithm to match the target vibration threshold, and determines an operating condition of the mechanical part by executing the predictive failure algorithm, and wherein based on the determination of failure of the mechanical part, the analysis component determines the operating condition of a second mechanical part.

7. The system of claim 6, further comprising:
    a notification component that generates a notification describing the operating condition of the mechanical part in response the analysis component executing the predictive failure algorithm.

8. A computer-implemented method, comprising:
    comparing, by a system operatively coupled to a processor, a measured temperature of a mechanical part with a threshold scheme associated with the mechanical part to identify a target vibration threshold of the threshold scheme, wherein the threshold scheme comprises a plurality of temperature ranges with a corresponding plurality of vibration thresholds and wherein the comparing identifies the target vibration threshold from the plurality of vibration thresholds by identifying a temperature range from the plurality of temperature ranges that encompasses the measured temperature; and
    updating, by the system, a predictive failure algorithm by altering the target vibration threshold based on the measured temperature of a mechanical part, wherein the vibration threshold represents an amount of vibration associated with a standard operating condition of the mechanical part within a defined temperature range of the measured temperature.

9. The computer-implemented method of claim 8, further comprising:
   collecting, by the system, temperature data characterizing the measured temperature;
   collecting, by the system, vibration data characterizing a measured amount of vibration experienced by the mechanical part during an operation of the mechanical part; and
   generating, by the system, a threshold scheme that characterizes a standard operating condition of the mechanical part based on the temperature data and the vibration data.

10. The computer-implemented method of claim 9, further comprising:
   extracting, by the system, the temperature data from a temperature log based on a defined interval of time.

11. The computer-implemented method of claim 8, wherein the altering comprises changing the vibration threshold of the predictive failure algorithm to match the target vibration threshold, and wherein the computer-implemented method further comprises determining, by the system, an operating condition of the mechanical part by executing the predictive failure algorithm.

12. The computer-implemented method of claim 11, further comprising:
   generating, by the system, a notification describing the operating condition of the mechanical part in response the executing the predictive failure algorithm.

13. A computer program product for determining an operating condition of a mechanical part, the computer program product comprising a computer readable storage medium having program instructions embodied therewith, the program instructions executable by a processor to cause the processor to:
   compare, by the processor, a measured temperature of a mechanical part with a threshold scheme associated with the mechanical part to identify a target vibration threshold of the threshold scheme, wherein the threshold scheme comprises a plurality of temperature ranges with a corresponding plurality of vibration thresholds and wherein the comparing identifies the target vibration threshold from the plurality of vibration thresholds by identifying a temperature range from the plurality of temperature ranges that encompasses the measured temperature; and
   update, by the processor, a predictive failure algorithm by altering the vibration threshold based on the measured temperature of the mechanical part, wherein the vibration threshold represents an amount of vibration associated with a standard operating condition of the mechanical part within a defined temperature range of the measured temperature.

14. The computer program product of claim 13, wherein the program instructions further cause the processor to:
   collect, by the processor, temperature data characterizing the measured temperature;
   collect, by the processor, vibration data characterizing a measured amount of vibration experienced by the mechanical part during an operation of the mechanical part; and
   generate, by the system, a threshold scheme that characterizes a standard operating condition of the mechanical part based on the temperature data and the vibration data.

15. The computer program product of claim 14, wherein the program instructions further cause the processor to:
   extract, by the processor, the temperature data from a temperature log based on a defined interval of time.

16. The computer program product of claim 13, wherein the program instructions further cause the processor to:
   alter, by the processor, the vibration threshold of the predictive failure algorithm to match the target vibration threshold; and
   determine, by the processor, the operating condition of the mechanical part by executing the predictive failure algorithm.

17. The computer program product of claim 16, wherein the program instructions further cause the processor to:
   generate, by the processor, a notification describing the operating condition of the mechanical part in response the executing the predictive failure algorithm.

* * * * *